Patented Mar. 2, 1954

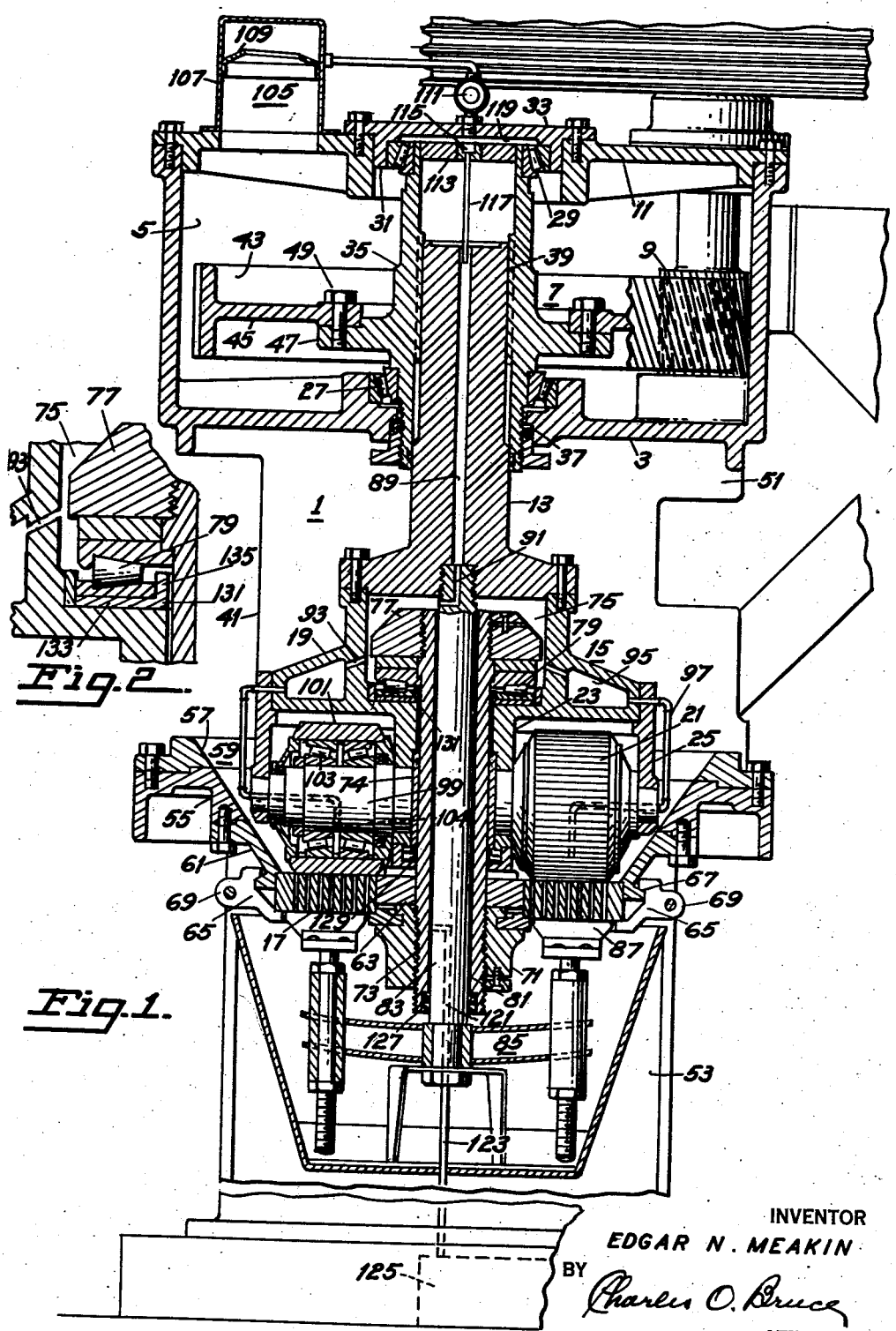

2,670,697

UNITED STATES PATENT OFFICE 2,670,697

PELLET MILL

Edgar N. Meakin, San Francisco, Calif.

Application August 22, 1945, Serial No. 612,078

11 Claims. (Cl. 107—14)

My invention relates to mills, and more particularly to mills for the manufacture of pellets.

Mills for the manufacture of pellets must, by reason of the heavy extrusion pressures involved, be constructed to withstand the large stresses and strains set up during the pelleting process. These machines, therefore, must of necessity be heavy and rugged. The wear on component parts, through mechanical action of the moving parts, or the abrasive and chemical action of the ingredients employed in the pellet mixture, requires occasional servicing and replacement of parts. To preclude wear on other components necessitates sufficient lubrication between all moving surfaces, except between the compression members and the die, from which, of course, all lubricating oil must be excluded.

Among the objects of my invention are:

(1) To provide a novel and improved pellet mill;

(2) To provide a novel and improved pellet mill wherein all component parts are readily accessible for adjustment or replacement;

(3) To provide a pellet mill having a novel and improved lubrication system embodied therein;

(4) To provide a novel and improved drive gear for pellet mills or the like;

(5) To provide a novel and improved bowl assembly for pellet mills or the like;

(6) To provide novel and improved means for maintaining lubrication in a thrust bearing or the like.

Additional objects of my invention will be brought out in the following description of a preferred embodiment of the same, taken in conjunction with the accompanying drawing wherein—

Figure 1 is a view in section through my novel and improved pellet mill, clearly depicting all the details of my invention;

Figure 2 is an enlarged view in section of a detail of Figure 1.

For a description of my invention including such details, reference will be had to the accompanying drawing.

The operating components of the mill are enclosed within a housing 1, the upper end of which is provided with a partition 3 to form a gear casing 5 for the main drive gear 7 and a drive pinion 9 in mesh with the main drive gear. The gear case is closed at the top by a reinforced cover plate 11 which, together with the partition 3, constitute spaced parallel walls of the gear casing.

The main gear 7 is in drive connection with a main drive shaft 13 extending down through the partition and terminating in a roller assembly 15 for effecting rotation of the same in the operation of the mill. This roller assembly is adapted to revolve about the upper surface of a die 17 supported in fixed position within the housing of the mill.

The roller assembly 15 constitutes a spider 19 carrying a pair of extrusion rollers 21, each mounted between a central portion 23 of the spider and an end plate 25 forming part thereof. These rollers wear during use and it becomes necessary occasionally to either reverse or replace them.

A feature of my invention, accordingly, is to provide a very rugged drive connection between the main gear 7 and the shaft 13 which will permit raising of the entire roller assembly 15 for this purpose, without in any way impairing the ruggedness of the drive engagement between the main gear and the drive shaft. To realize these two highly desirable aims in the one structure, I mount the main drive gear between its own thrust bearings 27 and 29, and independently of the drive shaft. These thrust bearings are of the tapered type, the lower bearing 27 being disposed in a circular edge recess provided in the partition about the opening through which the drive shaft enters the gear casing, while the upper of the bearings is seated in a depending recessed flange 31 forming part of a closure 33 for closing an aligned opening in the cover plate 11 of the gear casing.

In positioning the main gear 7 in the gear casing, the upper thrust bearing 29 and closure 33 are, of course, assembled following the placing of the gear on the lower bearing 27.

The gear includes a hub 35 which is adapted to extend through the partition opening, and the clearance between the hub and the partition is sealed by a packing gland 37.

The gear hub 35 is splined internally along an intermediate portion, while the upper end portion is of slightly enlarged internal diameter. The main drive shaft 13 is provided with complementary splines 39, and extends into the hub of the gear for a distance approximately to the end of the splined portion. This arrangement provides a very rugged and heavy-duty drive connection between the main gear and the drive shaft, while at the same time permitting the entire roller assembly to be raised when desired.

In this connection, it is noted that the mill housing 1 is provided with an opening or window 41 which permits access to the roller assembly from the outside, when the assembly is lifted from the die in the manner indicated.

Following an extended use of the mill, I have found that the main drive gear 7 also suffers some wear. The life of such gear can be materially increased by reversing the same, and I have simplified the answer to this problem by forming the rim 43 of the gear independently of the gear hub 35 and providing each with stub spokes 45 and 47, respectively, adapted for overlapping, to be joined together as by heavy bolts 49. Thus when it becomes necessary or desirable to reverse the gear, the cover plate 11 of the gear case may be removed, following which, the gear rim 43 may be unbolted from its hub and reversed without disturbing the hub 35 or its drive connection to the main drive shaft 13.

The mill housing 1 comprises an upper section 51 and a lower section 53 having complementary adjacent ends forming the upper half 55 and rim 57, respectively, of an inverted frusto-conical bowl 59 within which the pellet mixture is poured and the roller assembly is adapted to revolve in the process of extruding such pellet mixture through the die.

This bowl includes a lower half or smaller end section 61 which is closed at its smaller or lower end by a die assembly including the aforementioned die 17 and a centrally located die block 63 which, together with the die, form the floor of the bowl.

In previously designed pellet mills of the type illustrated and described, the upper and lower sections 55 and 61, respectively, of the bowl were made integral. By forming the bowl in sections as described, it becomes possible to remove the lower section, and by so dimensioning this lower section that its greatest diameter is slightly in excess of the greatest horizontal dimension of the roller assembly, it then becomes possible to lower the entire roller assembly 15, following removal of the lower section of the bowl.

The lower half of the housing, it is noted, is provided with large openings enabling convenient access to the roller assembly when so lowered, and by this arrangement it, therefore, becomes conveniently possible to dismantle the entire roller assembly for whatever purpose is deemed necessary.

The die 17 is supported around its outer edge by a die clamp 65 which hooks over a laterally extending flange 67 on the lower section of the bowl. This die clamp, for convenience of assembly, is formed of two semi-circular sections terminating in perforated tabs 69 enabling the sections to be bolted together into position.

The inner edge of the die and the die block are supported by a thrust nut 71 threaded to the lower end of a sleeve 73 which extends upwardly through the die block and a bushing 74 in an axial passage through the spider, into a central chamber 75 in the spider adjacent the lower end of the drive shaft 13, where it terminates in an upper thrust nut 77 supported on a thrust bearing 79.

Extending through the sleeve and spaced therefrom by a bushing 81, is a shaft 83. This shaft at its upper end is threaded into the lower end of the main drive shaft 13, and at its lower end protrudes beyond the end of the sleeve 73 and carries a knife bracket 85, each end of which supports a knife 87 adjacent the undersurface of the die.

In the operation of the machine as thus far described, the die remains stationary, while the rollers 21 and knives 87 move along opposite sides of the die. As previously indicated, a pellet mixture is poured into the bowl and guided by the sloping surface of the bowl, into the path of the moving rollers, whereby such material is extruded through the die openings, and from the lower surface of the die, the material thus extruded, is severed by the knives to form pellets.

Lubrication of the working components of the machine is essential to preclude unnecessary wear. To this end, the main drive shaft is provided with a longitudinal bore 89 which connects with a passage 91 through the connecting portion of the knife bracket shaft, which passage leads into the chamber 75 which houses the thrust bearing 79. Oil passages 93 drilled through the wall of the chamber connect the chamber to a core chamber 95 in the spider and from there a pipe connection 97 is established to the end of the shaft 99 of each roller 21. These pipe connections are, of course, removable, if necessary, to permit lowering of the roller assembly through the upper half of the bowl for servicing, as previously described.

Each roller is so constructed as to constitute an outer cylindrical shell 101 carried on roller bearings 103 surrounding the central portion of the roller shaft 99. The roller shaft, therefore, remains stationary and lubrication to the roller bearings may be realized through an oil passage 104 in the shaft forming a continuation of the pipe connection 97. Leakage of lubricating oil from the rollers is precluded by closing the ends of the rollers with suitable oil seals.

The gear casing 5 provides a suitable reservoir for lubricant, within which the pinion 9 and main drive gear 7 may function. This lubricant may also constitute the supply or source of lubricating oil for the rest of the machine.

When so intended, I contemplate placing on the cover plate 11 of the gear casing, a small reservoir 105 in the form of a housing 107 having an interior circular upwardly directed ledge 109 adapted to catch and retain lubricant from the splash of oil in the gear casing, from which it may be conducted through a glass metering valve 111 mounted in an opening at the center of the closure 33.

The main gear hub 35 is closed at its upper end by a plug 113 in the center of which is a small oil cup 115 having a pipe 117 depending therefrom and loosely fitting into the bore 89 in the main drive shaft 13. A small clearance 119 is provided between the closure 33 and the upper end of the gear hub and plug, from which it will be apparent that lubricant, if supplied at a sufficient rate, will not only be guided by the pipe 117 into the main drive shaft bore and thus be fed to the rest of the machine, but will also spread out over the upper end of the main gear hub and closure plug to provide lubrication for the upper thrust bearing 29.

Such lubricant as passes through the bore of the main drive shaft will ultimately fill the chamber 75 in the spider and, therefore, keep the thrust bearing 79 submerged in oil, while permitting a certain amount of the lubricant to flow through the passages 93 provided in the chamber wall and ultimately reach the rollers for the lubrication of their roller bearings.

Another portion of the lubricant will flow down between the sleeve 73 and the knife bracket supporting shaft 83 to the bushing 81 at the lower end of the shaft, from where it will be drained away through an oil passage 121 in the lower portion of the shaft, and a connecting pipe 123 to a catch basin 125 below.

Suitable oil seals 127 mounted in the sleeve below the bushing 81 will tend to preclude any leakage of oil past this point. Similar oil seals 129 are disposed about the sleeve 73 below the bushing 74, to preclude leakage of oil from the spider chamber 75, and maintain a full measure of oil therein.

Occasionally such oil seals may become defective. Should those oil seals 129 go bad, complete drainage of lubricant from the spider chamber could result, thereby, in the absence of some protective means, robbing the thrust bearing 79 of much needed oil supply. It, therefore, becomes very important that the thrust bearing in the spider chamber be maintained in a bath of lubricant in spite of any breakdown of the oil seals 129.

Accordingly and with this in mind, I have developed a dam 131 of metal, rubber or the like, which includes a flat circular portion 133 resting on the floor of the chamber and an upstanding cylindrical portion 135 surrounding the sleeve 13 and preferably slightly spaced therefrom. The pressure of the bearing against the flat circular portion 133 seals this portion to the floor of the chamber against leakage at this point, while the upstanding cylindrical portion 135 acts as a barrier wall to the escape of lubricant, the height of this barrier wall determining the level which will be maintained in the spider chamber in the event that the oil seals 129 should go bad. In this manner, a supply of lubricant to the thrust bearings will always be assured.

This barrier wall 135 need not necessarily be part of a separate element as described, but may be formed as an integral part of the spider structure.

It is noted that any raising of the roller assembly for the purpose of reversing or interchanging rollers as previously discussed, will not necessitate any dismantling of parts in the upper part of the mill, for by loosely fitting the pipe 117 in the bore of the main drive shaft, such pipe will not interfere with the necessary raising of the drive shaft along with the roller assembly when such operation is necessary.

The expression "cooperative pressure engagement," describing the relationship of the roller and die, does not necessarily connote physical contact but merely a relationship which results in pressure when the pellet mixture moves in between the roller and die. Thus in practice, the roller may be slightly displaced from the die.

It will become apparent from the above description of my invention in its preferred form, that the same fulfills all the objects of my invention, and while I have described such embodiment in great detail, the same is subject to modification and alteration, without departing from the underlying principles involved. In lieu of the splash feed provided in the embodiment disclosed by me, a closed lubricating system may be embodied in the machine, whereby a pump may be utilized to assure a continuous circulation of lubricant through the machine and back to the gear casing. Other changes will suggest themselves to those skilled in the art.

Accordingly, I do not desire to be limited in my protection to the specific details of my preferred embodiment as illustrated and described, except as may be necessitated by the appended claims.

I claim:

1. In a pellet mill, a housing; a roller assembly within said housing and including a plurality of rollers, a spider including an upper thrust bearing for holding said rollers in cooperative pressure engagement with a die, and a drive shaft extending upwardly from said spider and above said thrust bearing; a drive gear slidably splined to said drive shaft; means supporting said gear independently of said drive shaft to permit disconnection of said shaft and gear without affecting said gear supporting means; and a bowl of inverted frusto-conical shape supported from said housing and surrounding said roller assembly, said bowl including an upper portion and a removably attached lower horizontal portion and a die assembly at the bottom of said lower portion in such cooperative pressure engagement with said rollers, said upper portion having its smallest inside diameter slightly in excess of the greatest horizontal dimension of said roller assembly, to permit lowering of said roller assembly through the portion of said bowl remaining upon removal of said lower section without disturbing said upper thrust bearing.

2. In a pellet mill, a horizontally disposed die; a roller assembly including a compression member, means for holding said compression member in cooperative pressure engagement with a surface of said die, and a drive shaft extending from said holding means, said holding means having an axial passage terminating in a chamber adjacent the end of said drive shaft; a support for said die including a sleeve extending through said die and said axial passage in said holding means, and terminating at one end in a thrust nut in said chamber and at its other end in a thrust nut supporting said die, and a thrust bearing between said first thrust nut and a wall of said chamber; and a knife assembly including a knife bracket adjacent the other side of said die and a shaft extending through said sleeve and connecting with said drive shaft; said drive shaft having a longitudinal oil passage therethrough connecting with said chamber to provide access of lubricant to said thrust bearing and between said sleeve and knife assembly shaft.

3. In a pellet mill, a horizontally disposed die; a roller assembly including a plurality of rollers, a spider for holding said rollers in cooperative pressure engagement with the upper surface of said die, and a drive shaft extending upwardly from said spider, said spider having an axial passage terminating in a chamber adjacent the lower end of said drive shaft; a support for said die including a sleeve extending upwardly through said die and said spider axial passage, and terminating at its upper end in a thrust nut in said chamber and at its lower end in a thrust nut supporting said die, and a thrust bearing between said upper thrust nut and the floor of said chamber; and a knife assembly including a knife bracket below said die and a shaft extending upwardly through said sleeve and threadedly connecting with said drive shaft; said drive shaft and threadedly connected portion of said knife assembly shaft having a longitudinal oil passage therethrough connecting with said chamber to provide access of lubricant to said thrust bearing and between said sleeve and knife assembly shaft.

4. In a pellet mill, a horizontally disposed die; a roller assembly including a plurality of rollers, a spider for holding said rollers in cooperative pressure engagement with the upper surface of said die, and a drive shaft extending upwardly from said spider, said spider having an axial passage terminating in a chamber adjacent the lower end of said drive shaft; a support for said die including a sleeve extending upwardly through said die and said spider axial passage, and terminating at its upper end in a thrust nut in said chamber and at its lower end in a thrust nut supporting said die, and a thrust bearing between said upper thrust nut and the floor of said chamber; a knife assembly including a knife bracket below said die and a shaft extending upwardly through said sleeve and threadedly connecting with said drive shaft; said drive shaft and threadedly connected portion of said knife assembly shaft having a longitudinal oil passage therethrough connecting with said chamber to provide access of lubricant to said thrust bearing and between said sleeve and knife assembly shaft; and means for conducting lubricant from said chamber to said rollers.

5. In a pellet mill, a horizontally disposed die; a roller assembly including a plurality of rollers, a spider for holding said rollers in cooperative pressure engagement with the upper surface of said die, and a drive shaft extending upwardly from said spider, said spider having an axial passage terminating in a chamber adjacent the lower end of said drive shaft; a support for said die including a sleeve extending upwardly through said die and said spider axial passage, and terminating at its upper end in a thrust nut in said chamber and at its lower end in a thrust nut supporting said die, and a thrust bearing between said upper thrust nut and the floor of said chamber; a knife assembly including a knife bracket below said die and a shaft extending upwardly through said sleeve and threadedly connecting with said drive shaft; said drive shaft and threadedly connected portion of said knife assembly shaft having a longitudinal oil passage therethrough connecting with said chamber to provide access of lubricant to said thrust bearing and between said sleeve and knife assembly shaft, an oil seal about said sleeve adjacent the lower end of said spider, and a dam between said thrust bearing and said sleeve to maintain a lubricant level in said chamber for said thrust bearing, should said oil seal fail.

6. In a pellet mill, a horizontally disposed die; a roller assembly including a plurality of rollers, a spider for holding said rollers in cooperative pressure engagement with the upper surface of said die, and a drive shaft extending upwardly from said spider, said spider having an axial passage terminating in a chamber adjacent the lower end of said drive shaft; a gear casing about the upper end of said drive shaft; an internally splined drive gear supported in said gear casing independently of said drive shaft, said drive shaft extending part way through said gear and having splines slidably fitting the splined interior of said gear; a support for said die including a sleeve extending upwardly through said die and said spider axial passage, and terminating at its upper end in a thrust nut in said chamber and at its lower end in a thrust nut supporting said die, and a thrust bearing between said upper thrust nut and the floor of said chamber; a knife assembly including a knife bracket below said die and a shaft extending upwardly through said sleeve and threadedly connecting with said drive shaft; said drive shaft and threadedly connected portion of said knife bracket shaft having a longitudinal oil passage therethrough connecting with said chamber to provide access of lubricant to said thrust bearing and said sleeve, and means for conducting lubricant from said gear casing to said oil passage in said drive shaft.

7. In a pellet mill, a gear casing including opposing walls, a pair of aligned bearings supported by said walls, a gear having a hub extending between and mounted in said bearings whereby said gear will be rotatably supported by and between such bearings independently of any drive shaft, and an assembly including a drive shaft in drive engagement with said gear.

8. In a pellet mill, a housing including a gear casing having opposing walls, said walls having means for the positioning of aligned bearings, bearings disposed in said positioning means, a gear having a hub extending between and mounted in said bearings whereby said gear will be rotatably supported by and between such bearings independently of any drive shaft, and an assembly including a drive shaft slidably splined to said gear.

9. In a pellet mill, a gear casing including opposing horizontal walls, a pair of aligned bearings supported by said walls, a gear rotatably supported by and between such bearings, an extrusion assembly including a drive shaft slidably splined to said gear, said drive shaft having a longitudinal bore therein, and means for feeding lubricant directly into said bore without impairing relative slidability between said drive shaft and said gear, said means including a plug in the hub of said gear above the end of said drive shaft, a pipe depending from said plug and loosely fitting into said bore and providing communication between the space above said plug and said bore, and a source of lubricant having connection to said pipe.

10. In a pellet mill, a gear casing including opposing horizontal walls, a pair of aligned bearings supported by said walls, a gear rotatably supported by and between such bearings with the upper end of its hub in slight spaced relationship to the upper of said walls, an extrusion assembly including a drive shaft slidably splined to said gear and normally terminating short of the upper end of said hub, said drive shaft having a longitudinal bore therein, and means for feeding lubricant to the upper of said bearings and directly into said bore without impairing slidability between said drive shaft and gear, said means including a plug in the upper end of said hub, a pipe depending from said plug and loosely fitting into said bore and providing communication between the space above said plug and said bore, and a source of lubricant having access to said space.

11. In a pellet mill, a housing; a bowl supported within said housing and including a die assembly forming the bottom of said bowl; an extrusion assembly in cooperative pressure engagement with said die, said extrusion assembly including a drive shaft connecting with a spider carrying a compression roller, said spider having an axial passage therethrough connecting with a chamber adjacent the end of said drive shaft; and a thrust bearing assembly including a shaft extending through said axial passage into said chamber, a thrust nut on one end of said shaft in pressure relationship with said die assembly, a bearing in said chamber, and a thrust nut on the chamber end of said shaft in pressure relationship with said bearing.

EDGAR N. MEAKIN.

References Cited in the file of this patent

UNITED STATES PATENTS

| Number | Name | Date |
|---|---|---|
| 299,883 | Wallace | June 3, 1884 |
| 1,731,885 | Burnham et al. | Oct. 15, 1929 |
| 1,954,086 | Meakin | Apr. 10, 1934 |
| 1,994,371 | Sizer | Mar. 12, 1935 |
| 2,065,141 | Meakin | Dec. 2, 1936 |
| 2,075,450 | Meakin | Mar. 30, 1937 |
| 2,077,880 | Gits | Apr. 20, 1937 |
| 2,116,166 | Christian | May 3, 1938 |
| 2,124,744 | Meakin | July 26, 1938 |
| 2,295,743 | Meakin | Sept. 15, 1942 |